Patented Apr. 14, 1953

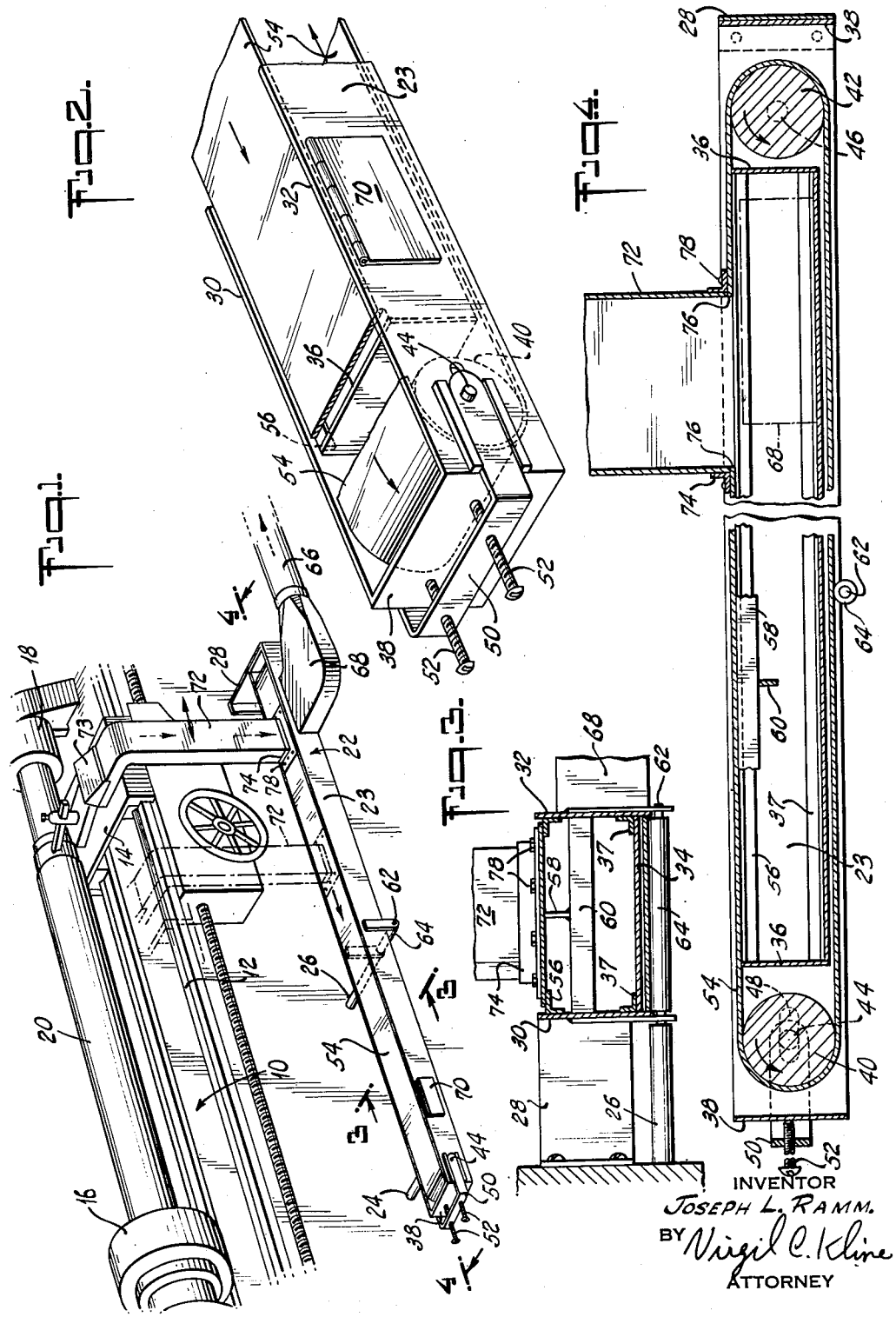

2,634,560

UNITED STATES PATENT OFFICE 2,634,560

TRAVELING WASTE COLLECTOR

Joseph L. Ramm, Metairie, La., assignor to Johns-Manville Corporation, New York, N. Y., a corporation of New York Application September 27, 1950, Serial No. 186,951

12 Claims. (Cl. 51—273)

The instant invention relates to a device for removing dust, chips, and other waste matter from the vicinity of the cutting head of power tools, such as lathes, and other apparatus which produce waste as a by-product of their operation.

The principal object of the invention is the provision of a waste remover having a waste receiving member adapted to travel with the waste producing device, for example, the cutting tool of a lathe. The instant invention finds a particular field of use in connection with the machining of materials such as hardened, compressed asbestos-cement materials where substantial quantities of dust and chips are produced. For example, in the preparation of asbestos-cement pipe and fittings, machining operations are often required, these ordinarily being done on a lathe of basically conventional type having a traveling carriage supporting the cutting tool. Accordingly, the invention will be shown and described in connection with a lathe for such purpose, but it will be understood that the device of the invention is equally applicable to other cases where a traveling or reciprocating waste source is present, whether as a result of machining asbestos-cement or other products, or as a result of other operations.

Another object of the invention is the provision of a waste remover, including a duct mounted for travel with the carriage which supports the tool or other waste producing device, the duct leading to a collection chamber. The collection chamber is constructed to permit entry of the waste in any position of the duct.

Another object of the invention is the provision of a waste remover, including a duct carried by the waste producing device and mounted for travel therewith, an elongated box or collection chamber, and a belt forming the closure for the box, the duct being connected to the belt and in communication with the interior of the box through the belt.

A further object of the invention is the provision of such apparatus in which means are provided for connecting the collection chamber or box to a conventional or other pneumatic waste withdrawal system.

My invention will be more fully understood and further objects and advantages will become apparent when reference is made to the following detailed description of a preferred embodiment of the invention and to the accompanying drawings in which:

Fig. 1 is a perspective view of a waste remover embodying the instant invention;

Fig. 2 is a detail view on an enlarged scale, illustrating an end of the waste collecting chamber;

Fig. 3 is a sectional view on an enlarged scale, taken on the line 3—3 of Fig. 1; and, Fig. 4 is a sectional view on an enlarged scale, taken on the line 4—4 of Fig. 1.

Referring now to the drawings, a portion of a lathe 10 is diagrammatically shown in Fig. 1, a lathe being representative of the type of machines to which the present invention is particularly applicable. As illustrated, the lathe includes a bed 12, a carriage 14 adapted to move along the bed, and chucks or heads 16 and 18 in which the work to be machined is mounted. The work is shown as a tube or pipe 20, such as a section of asbestos-cement pipe.

In accordance with the instant invention, a waste remover, indicated in its entirety by the reference character 22, is provided to carry the dust, chips and other waste to a waste withdrawal and disposal system. The waste remover includes an elongated collection chamber or box 23 of a length equal to, or preferably somewhat greater than, the distance of travel of the carriage 14 on the bed 12. The chamber or box is supported in a stationary position from fixed frame members by brackets 24, 26 and 28.

Referring now particularly to Figs. 2, 3 and 4, the chamber comprises side walls 30 and 32, a bottom wall 34 suitably spaced upwardly from the lower edges of the side walls, and partition or end members 36 spaced inwardly of the ends of the side walls and terminating a short distance from their upper edges. Angle members 37 are employed to reinforce the corners between the side walls and the bottom wall. These several parts, which may be secured together by welding or other suitable means, define an open topped box. The extending ends of the side walls are connected by end walls 38.

Pulleys 40 and 42 are mounted between the extension of the side walls at opposite ends of the box on shafts 44 and 46, respectively. Shaft 46 is suitably mounted directly on the side wall extensions and shaft 44 is carried by special means to permit pulley 40 to serve as a belt tightener. To this end shaft 44 extends through elongated slots 48 in the side wall extensions and through perforations or seats in the legs of a U-shaped bracket 50 embracing the end of the collection chamber. The base of the bracket extends behind end wall 38, and carries adjusting screws 52 for contact with the end wall whereby the pulley may be drawn outwardly to increase the tension of the belt.

The pulleys 40 and 42 support a belt 54, which has its upper reach overlying the open side of the box, as illustrated particularly in Figs. 3 and 4. To prevent the belt from sagging and to provide a seal between the edges of the belt and the interior of the box, angle irons 56 are welded or otherwise secured to the side walls of the box, the angle irons having flanges underlying the edges of the upper reach of the belt. A longitudinally extending belt supporting rib 58 with its upper edge underlying the belt is also provided, the rib being carried by transverse supports 60 spaced at suitable intervals the length of the box.

Bracket 26, previously referred to, in addition to its function of aiding to support the box, also serves to prevent undue sagging of the lower reach of the belt. To this end, the bracket includes a pin 62 on which a roller 64 is mounted for contact with the lower reach of the belt.

An outlet leads from the collection chamber 23 to a pneumatic waste withdrawal and disposal system. The latter is of conventional construction and includes a blower or other device for setting up a current of air moving outwardly in a duct 66 connected by an elbow 68 to the outlet of the collection chamber. The collection chamber is also provided with a clean out door 70 for removal of any waste which may not be taken care of by the pneumatic system.

A duct 72, preferably of sheet metal, has an open mouth adjacent the waste producing device, such as the cutting tool, the duct being rigidly mounted on carriage 14 for movement therewith. The mouth may be defined in part by a hinged section 73. Duct 72 extends downwardly to a point overlying the upper side of the collection chamber. At this point, it is provided with a flanged connector 74. Belt 54 in the preferred embodiment, rather than being continuous, has separated ends 76 which are secured as by rivets 78 to opposite flanges of the connector, whereby the duct is in communication with the interior of the collection chamber between the ends of the belt. It will be appreciated, however, that the belt may be continuous and the end of the duct secured about an opening through the belt. Where the ends of the belt are separated as illustrated, the side flanges of the connector cover any remaining area of the open side of the box and overlie the angle members 56.

In the operation of the waste collector, the suction set up in the main waste removal system causes withdrawal of air through the mouth of duct 72, the air current sweeping through duct 72, collection chamber 23 and into duct 66. When the lathe or other machine is operated, the dust, chips and shavings or other fine particles are drawn into the mouth of duct 72 and carried by the airstream through the collection chamber and duct 66 to the waste disposal point. As the carriage moves along the bed 12 it carries duct 72 with it, the belt shifting on its pulleys 40 and 42 in conformity with the movement of the end of the duct. For example, the carriage, and hence the duct, may move as illustrated in Fig. 1, from the full line position to the dotted line position, communication between the mouth of the duct 72, the interior of the collection chamber, and the air withdrawal system being maintained.

Due to the suction forces set up by the air withdrawal system, the upper reach of the belt is held against angle members 56 to maintain a relatively tight seal, and little if any dust enters the room. The instant invention provides a simple device, readily constructed and mounted. The parts which move with the carriage are relatively light in weight, the bulk of the device being stationary.

Having thus described my invention is rather full detail, it will be appreciated that these details need not be strictly adhered to and that various changes and modifications may suggest themselves to one skilled in the art, all falling within the scope of the invention as defined by the subjoined claims.

What I claim is:

1. In a waste remover for a traveling waste producing device, a closed chamber having a movable wall and closed thereby, a rigid duct leading from a point adjacent the waste producing device and movable therewith, said duct being in communication with the chamber through the movable wall and attached to the movable wall to cause said wall to move with said duct, and means for creating suction in said chamber.

2. In a waste remover for a traveling waste producing device, an elongated, stationary, closed chamber, one wall of said chamber having an opening movable longitudinally of the chamber, and a rigid duct leading from adjacent the waste producing device and movable therewith, said duct extending to and attached to said wall for causing said wall to move longitudinally with said duct and being in communication with the interior of the chamber through the opening therein.

3. In a waste remover for a traveling waste producing device, an elongated, closed chamber, a belt mounted for travel longitudinally of the chamber and having a reach defining a wall thereof, and a duct leading from adjacent the waste producing device and movable therewith, said duct being in communication with the chamber through the wall defining reach of the belt.

4. In a waste remover for a traveling waste producing device, an elongated chamber, a belt mounted for movement longitudinally of the chamber and defining a wall thereof, said belt having spaced ends, and a duct leading from adjacent the waste producing device and movable therewith, the duct connecting the ends of the belt and being in communication therebetween with the chamber.

5. In a waste remover for a traveling waste producing device, an elongated chamber, a belt mounted for movement longitudinally of the chamber and defining a wall thereof, said belt having spaced ends, a duct leading from adjacent the waste producing device and movable therewith, the duct connecting the ends of the belt and being in communication therebetween with the chamber, and means for connecting the chamber to a pneumatic waste withdrawal apparatus.

6. In a waste remover for a traveling waste producing device, an elongated box having an open side, pulleys supported for free rotation at opposite ends of the box, a belt mounted for travel on the pulleys and overlying the open side of the box, and a duct leading from adjacent the waste producing device and movable therewith, an end of the duct being connected to the belt and in communication therethrough with the interior of the box.

7. In a waste remover for a traveling waste producing device, an elongated box having an open side, pulleys supported for free rotation at opposite ends of the box, a belt mounted for travel on the pulleys and overlying the open side of the box, a duct leading from adjacent the waste producing device and movable therewith, an end of the duct being connected to the belt and in communication therethrough with the interior of the box, and an outlet in said box for connection to a pneumatic waste withdrawal apparatus.

8. In a waste remover for a traveling waste producing device, a stationary, elongated box having an open side, pulleys supported for free rotation at opposite ends of the box, a duct supported adjacent the waste producing device for movement therewith and leading to a point adjacent the open side of the box, and a belt mounted for travel on said pulleys, said belt overlying the open side of the box and being connected to said duct.

9. In a waste remover for a traveling waste producing device, a stationary, elongated box having an open side, pulleys supported for rotation at opposite ends of the box, a duct supported adjacent the waste producing device for movement therewith and having a discharge end adjacent said open side of the box, and a belt mounted on said pulleys for travel thereon, said belt overlying the open side of the box and having spaced ends connected to the duct at said discharge end.

10. In a waste remover for a traveling waste producing device, a stationary, elongated, open-sided box having side walls and a bottom wall with the bottom wall terminating inwardly of the ends of the side walls, partition walls connecting the side walls, pulleys supported by the side walls outside of the partition walls, a duct supported adjacent the waste producing device for travel therewith and terminating in a discharge end adjacent the open side of the box, and a belt mounted on said pulleys for travel thereon, said belt overlying the open side of the box and being connected to the duct at said discharge end.

11. In a waste remover for a traveling waste producing device, a stationary, elongated, open-sided box having extended side walls, pulleys supported by the extended side walls at opposite ends of the box, a belt carried by said pulleys and forming a closure for the open side of the box, a duct carried by the waste producing device for travel therewith, said duct being connected to said belt and in communication with the interior of the box, and an outlet in said box for connection to a pneumatic waste withdrawal apparatus.

12. In an apparatus for collecting fine particles from a traveling device for producing said particles, a stationary collection chamber formed with stationary walls and one movable wall for completely enclosing said chamber, a duct having an inlet opening adjacent said particle producing device and mounted for movement therewith, said duct extending to said movable wall and formed with a discharge opening leading therethrough into the interior of said chamber, said duct being firmly attached to said movable wall to cause said wall to travel with said duct, and means for creating suction in said chamber.

JOSEPH L. RAMM.

References Cited in the file of this patent

UNITED STATES PATENTS

| Number | Name | Date |
|---|---|---|
| 236,271 | Stevens | Jan. 4, 1881 |
| 413,606 | Mefford | Oct. 22, 1889 |
| 1,888,302 | Weaver et al. | Nov. 22, 1932 |
| 2,011,984 | Rosenberger | Aug. 20, 1935 |
| 2,394,556 | Martin | Feb. 12, 1946 |
| 2,399,239 | Martin | Apr. 30, 1946 |